United States Patent
Hu

(10) Patent No.: US 9,421,912 B1
(45) Date of Patent: Aug. 23, 2016

(54) AUXILIARY REARVIEW MIRROR MOUNTING STRUCTURE

(71) Applicant: Tsai-Fu Hu, Tainan (TW)

(72) Inventor: Tsai-Fu Hu, Tainan (TW)

( * ) Notice: Subject to any disclaimer, the term of this patent is extended or adjusted under 35 U.S.C. 154(b) by 0 days.

(21) Appl. No.: 14/722,105

(22) Filed: May 26, 2015

(30) Foreign Application Priority Data

Apr. 14, 2015 (TW) .............................. 104205529 U

(51) Int. Cl.
*B60R 1/078* (2006.01)
*F16B 2/00* (2006.01)
*F16B 2/06* (2006.01)
*B60R 1/06* (2006.01)

(52) U.S. Cl.
CPC ................. *B60R 1/078* (2013.01); *B60R 1/06* (2013.01); *F16B 2/005* (2013.01); *F16B 2/065* (2013.01)

(58) Field of Classification Search
CPC ......... B60R 1/078; B60R 1/06; F16B 2/005; F16B 2/065; G02B 5/08; G02B 7/182
USPC ...... 248/475.1; 359/850, 854, 865, 871, 872
See application file for complete search history.

(56) References Cited

U.S. PATENT DOCUMENTS

| | | | | |
|---|---|---|---|---|
| 1,459,093 A * | 6/1923 | French | .................... | B25B 5/003 269/156 |
| 2,988,310 A * | 6/1961 | Wright | .................... | A45B 11/00 108/49 |
| 3,052,462 A * | 9/1962 | Butler | .................... | B25B 5/101 269/249 |
| 4,892,400 A * | 1/1990 | Brookes | .................. | B60R 1/078 359/865 |
| 5,096,283 A * | 3/1992 | Croteau | .................. | B60R 1/081 248/485 |
| 5,312,097 A * | 5/1994 | Womack | ................. | B25B 5/003 269/139 |
| 5,454,551 A * | 10/1995 | Hobday | .................... | B25B 5/06 269/170 |
| 5,690,604 A * | 11/1997 | Barnett | .................. | A61H 19/44 248/229.15 |
| 5,724,199 A * | 3/1998 | Hu | .......................... | B60R 1/078 359/871 |
| 5,870,236 A * | 2/1999 | Barksdale | ............... | B60R 1/078 224/554 |
| 6,431,534 B1 * | 8/2002 | Orosz | ..................... | B25B 5/101 269/249 |
| 6,988,810 B2 * | 1/2006 | Chen | ...................... | B60R 1/078 359/871 |
| 7,628,498 B1 * | 12/2009 | Huang | .................... | B60R 1/078 359/871 |
| 7,866,835 B2 * | 1/2011 | Liu | ......................... | B60R 1/078 248/475.1 |
| 7,891,618 B2 * | 2/2011 | Carnevali | .......... | A47B 21/0314 248/228.5 |
| 8,459,602 B2 * | 6/2013 | Herskovic | ............ | A61G 7/0503 248/229.13 |
| 8,596,601 B1 * | 12/2013 | Andersen | ............. | F16M 13/022 211/96 |
| 2007/0019312 A1 * | 1/2007 | Hu | .......................... | B60R 1/078 359/871 |
| 2008/0239532 A1 * | 10/2008 | Wu | ........................ | B60R 1/078 359/872 |
| 2015/0183374 A1 * | 7/2015 | Liu | ......................... | B60R 1/078 359/865 |

* cited by examiner

*Primary Examiner* — Nkeisha Smith
(74) *Attorney, Agent, or Firm* — Raymond Y. Chan; David and Raymond Patent Firm

(57) ABSTRACT

An auxiliary rearview mirror mounting structure includes two support arms of angularly adjustable multi-segment design pivotally connected to an auxiliary rearview mirror, multiple hooks located at each support arm for hooking on the rim of a main rearview mirror, and tightening-up devices mounted in each support arm corresponding to one respective hook and rotatably movable inwards and backwards for abutting against the rim of the main rearview mirror to lock the hooks to the rim of a main rearview mirror.

12 Claims, 9 Drawing Sheets

AUXILIARY REARVIEW MIRROR MOUNTING STRUCTURE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to vehicle rearview mirror and more particularly, to an auxiliary rearview mirror mounting structure that fits any of a variety of main rearview mirrors, facilitates mounting and dismounting the auxiliary rearview mirror, and enhances the mounting stability.

2. Description of Related Arts

FIG. 1 illustrates a conventional auxiliary rearview mirror mounting structure mounted at an outer lateral side of a main rearview mirror 30 of a car 20 to provide a wide angle rear view. Adding an auxiliary rearview mirror to each rearview mirror of a trailer would be of a great help. This design of auxiliary rearview mirror mounting structure, as shown in FIG. 2, comprises a pivot holder 50 mounted at a rear side of an auxiliary rearview mirror 10, a pair of support arms 40 pivotally connected to the pivot holder 50, and two binding straps 60 respectively extended from one support arm 40 and fastenable to the other support arm 40 to secure the two support arms 40 to a main rearview mirror 30. This design of auxiliary rearview mirror mounting structure can be seen in Taiwan Patent No.I256358.

FIG. 3 illustrates another prior art design of auxiliary rearview mirror mounting structure for fastening an auxiliary rearview mirror 10a to a main rearview mirror 30. This design of auxiliary rearview mirror mounting structure comprises a rod member 10b having an outer end pivotally connected to the auxiliary rearview mirror 10a, a plurality of hooking blocks 70 respectively slidably attached to the rod member 10b and locked thereto at respective selected locations with a respective lock screw 701, a strap 60 extended from one side of each hooking block 70 comprises and terminating in a hook 702, and a tightening-up device 703 mounted at each hooking block 70. Each tightening-up device 703 comprises a hand screw 7031 threaded through one respective hooking block 70 and terminating in a ball socket 7032, a rigid pad 7033 pivotally coupled to the ball socket 7032, and a flexible pad 7034 bonded to the rigid pad 7033. In installation, hook the hooks 702 on the rim 301 of the main rearview mirror 30, and then rotate the tightening-up devices 703 to rightly abut the flexible pads 7034 of the tightening-up devices 703 against the main rearview mirror 30.

However, because the straps 60 are made from flexible rubber, elastic fatigue can occur in the straps 60 after a long use. When the straps 60 get loose, they will not be closely attached to the back surface of the main rearview mirror 30, resulting in mounting instability. Further, if the straps 60 have different tensions, the auxiliary rearview mirror 10a and the main rearview mirror 30 will be vibrated during running of the vehicle, leading to image blur and the risk of falling of the auxiliary rearview mirror 10a from the main rearview mirror 30. Further, different main rearview mirrors 30 have a different shape and curvature of rim 301. The rod member 10b is not adjustable to fit the curvatures of the rims 301 of all different main rearview mirrors 30. Thus, the hooks 702 of the hooking device 70 cannot be positively hooked on the rims 301 of all different main rearview mirrors 30. Therefore, the conventional auxiliary rearview mirror mounting structure designs still have strong demand for improvement.

SUMMARY OF THE PRESENT INVENTION

The present invention has been accomplished under the circumstances in view. It is therefore the main object of the present invention to provide an auxiliary rearview mirror mounting structure, which is highly adjustable to fit any of a variety of main rearview mirrors and, which facilitates mounting and dismounting the auxiliary rearview mirror, and enhances the mounting stability.

To achieve this and other objects of the present invention, an auxiliary rearview mirror mounting structure comprises an auxiliary rearview mirror, two support arms respectively connected to said auxiliary rearview mirror, and a plurality of hooks symmetrically located at the support arms and adapted for hooking on main rearview mirror. Each hook comprises an extension portion extended from the respective support arm, and a hook portion extended from a distal end of the extension portion remote from the respective support arm for hooking on a vehicle rearview mirror. Further, each hook is formed integral with an inner side of one respective support arm. Further, each support arm is equipped with a plurality of tightening-up devices corresponding to respective hooks at the associating support arm. The tightening-up devices are rotatably threaded through the associating support arm from an outer side of the associating support arm toward an inner side thereof. Each tightening-up device comprises a friction pad located at a front end thereof and facing toward the hook portion of one respective hook and adapted for securing the hook portion of one respective hook to a vehicle rearview mirror. Each support arm further comprises a pivot joint pivotally disposed between two hooks.

Preferably, each tightening-up device comprises a knob, a screw rod extended from the knob and threaded through the associating support arm and terminating in a ball socket. Further, the friction pad of each tightening-up device is pivotally coupled to the ball socket of the respective tightening-up device.

Preferably, the friction pad comprises a rigid pad pivotally coupled to the ball socket of the screw rod of the associating tightening-up device, and a flexible pad bonded to one side of the rigid pad and facing toward the hook portion of one respective hook.

Preferably, each tightening-up device further comprises a flexible dust sleeve sleeved onto the associating screw rod and stopped between the associating knob and the respective support arm.

Preferably, each support arm comprises a first arm portion pivotally connected with one end thereof to the auxiliary rearview mirror, a second arm portion pivotally connected with one end thereof to an opposite end of the first arm portion remote from the auxiliary rearview mirror, a third arm portion pivotally connected to an opposite end of the second arm portion remote from the first arm portion, a first pivot joint pivotally connected between the second arm portion and the third arm portion, and a second pivot joint pivotally connected between the first arm portion and the second arm portion. Further, the hooks are respectively mounted at the second arm portion and third arm portion of each support arm.

Preferably, the auxiliary rearview mirror mounting structure further comprises a flexible cap member capped on the hook portion of each hook. The flexible cap member has a relatively higher front side and a relatively lower rear side. The design of the relatively higher front side and relatively lower rear side of the flexible cap member can match with the gradually outwardly reducing wall thickness design of the peripheral wall of various different commercial main rearview mirrors, enhancing mounting stability.

DETAILED DESCRIPTION OF THE PREFERRED EMBODIMENT

Figure 1:
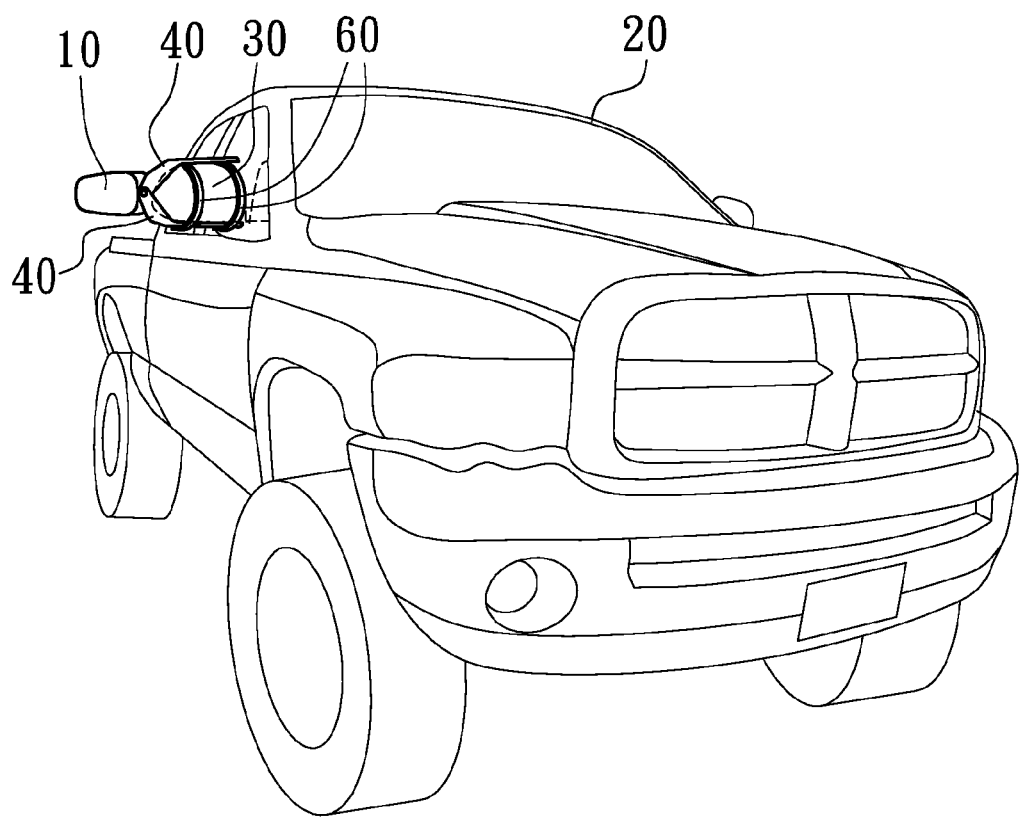
FIG. 1 is an elevational view illustrating an auxiliary rearview mirror mounting structure installed in a rearview mirror of a car according to the prior art.
Figure 2:
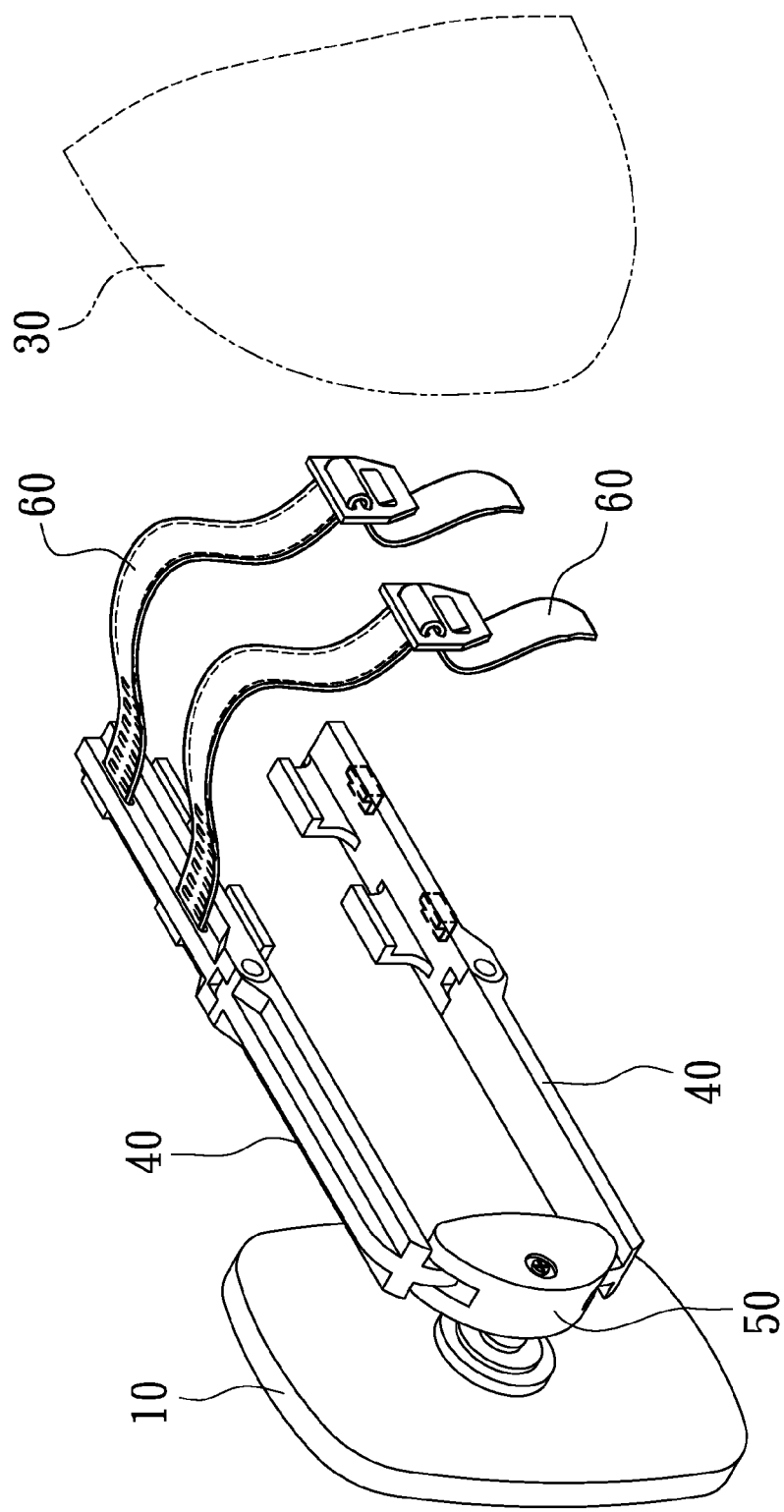
FIG. 2 is an elevational view of the auxiliary rearview mirror mounting structure shown in FIG. 1.
Figure 3:
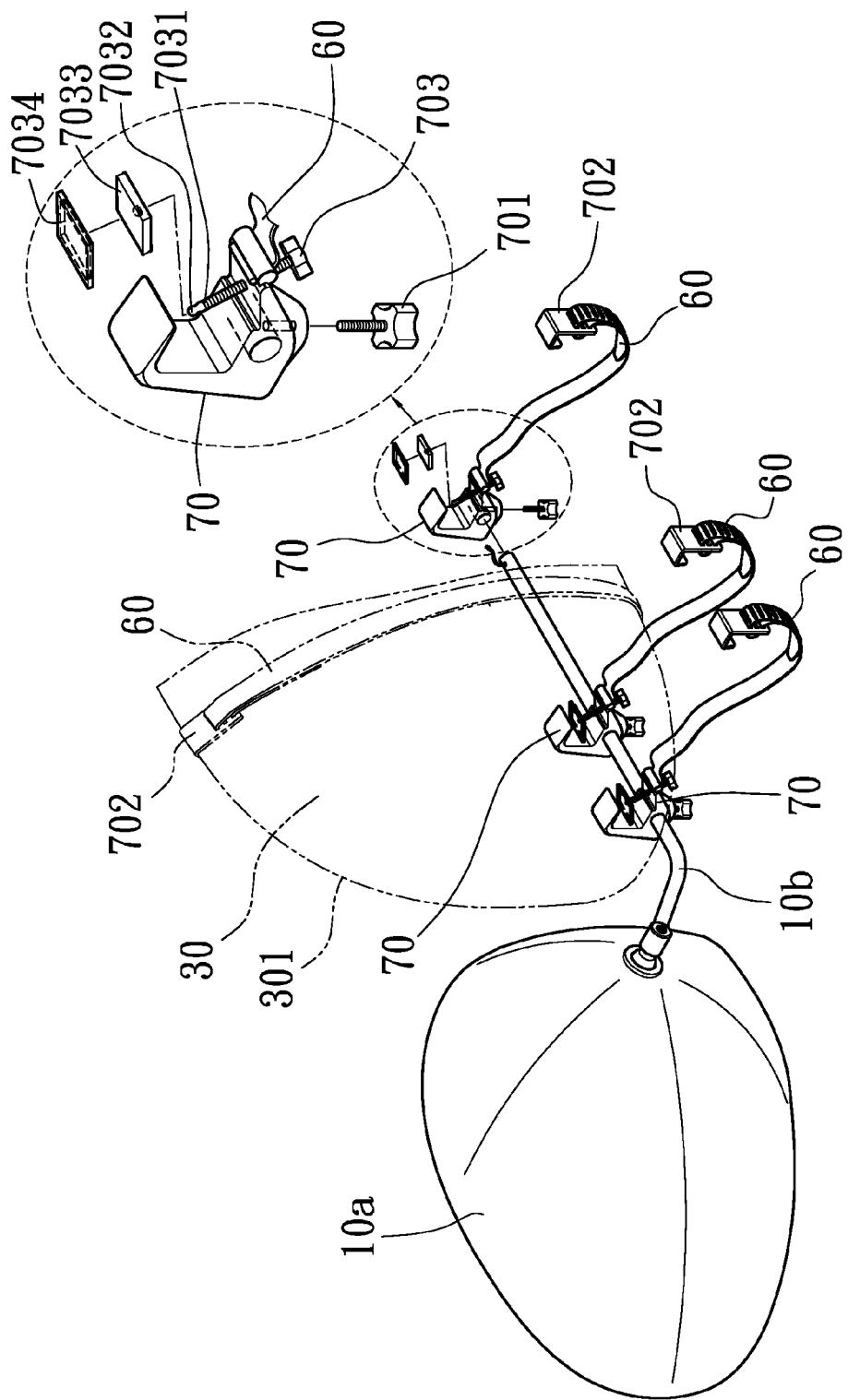
FIG. 3 is an exploded view of another design of auxiliary rearview mirror mounting structure according to the prior art.
Figure 4:
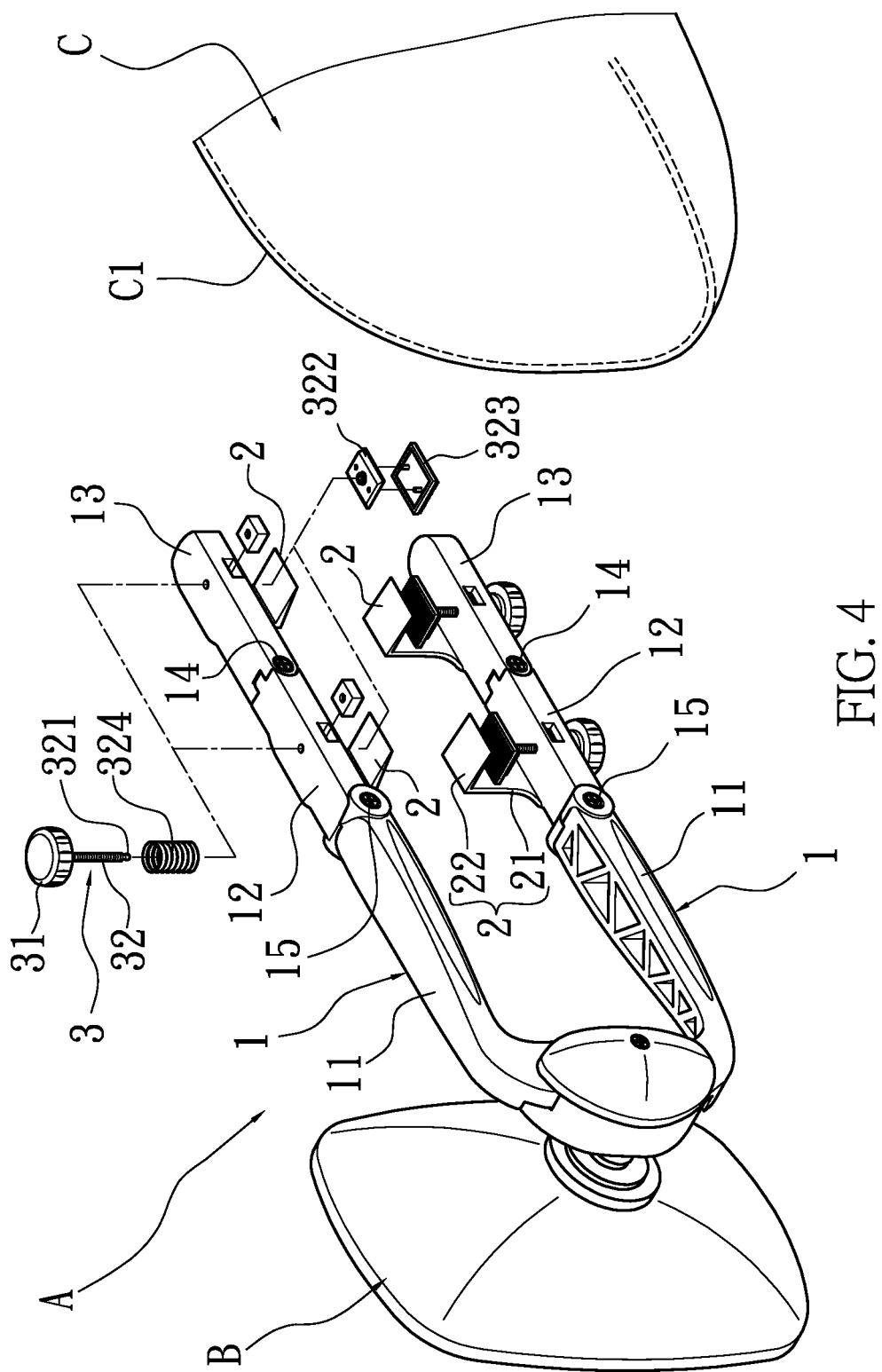
FIG. 4 is an exploded view of an auxiliary rearview mirror mounting structure according to the present invention.

Referring to FIG. 4, an auxiliary rearview mirror mounting structure A is pivotally connected to a back side of an auxiliary rearview mirror B and fastenable to a rim C1 of a main rearview mirror C in a motor vehicle to secure the auxiliary rearview mirror mounting structure A to the main rearview mirror C.

The auxiliary rearview mirror mounting structure A comprises a pair of support arms 1. The support arms 1 are made from a hard plastic material, each comprising a first arm portion 11 pivotally connected with its one end to the auxiliary rearview mirror B, a second arm portion 12 pivotally connected with its one end to an opposite end of the first arm portion 11 remote from the auxiliary rearview mirror B, a third arm portion 13 pivotally connected to an opposite end of the second arm portion 12 remote from the first arm portion 11, a first pivot joint 14 pivotally connected between the second arm portion 12 and the third arm portion 13, and a second pivot joint 15 pivotally connected between the first arm portion 11 and the second arm portion 12. Thus, the first arm portion 11, second arm portion 12 and third arm portion 13 of each support arm 1 can be biased relative to one another to adjust the angular configuration of the respective support arm 1 (see FIG. 5). Each support arm 1 further comprises two hooks 2 respectively integrally extended from the second arm portion 12 and third arm portion 13 thereof at an inner side. Each hook 2 comprises an extension portion 21 extended from the second arm portion 12 and third arm portion 13, and a hook portion 22 extended from a distal end of the extension portion 21 remote from the second arm portion 12 and third arm portion 13.

Figure 6:
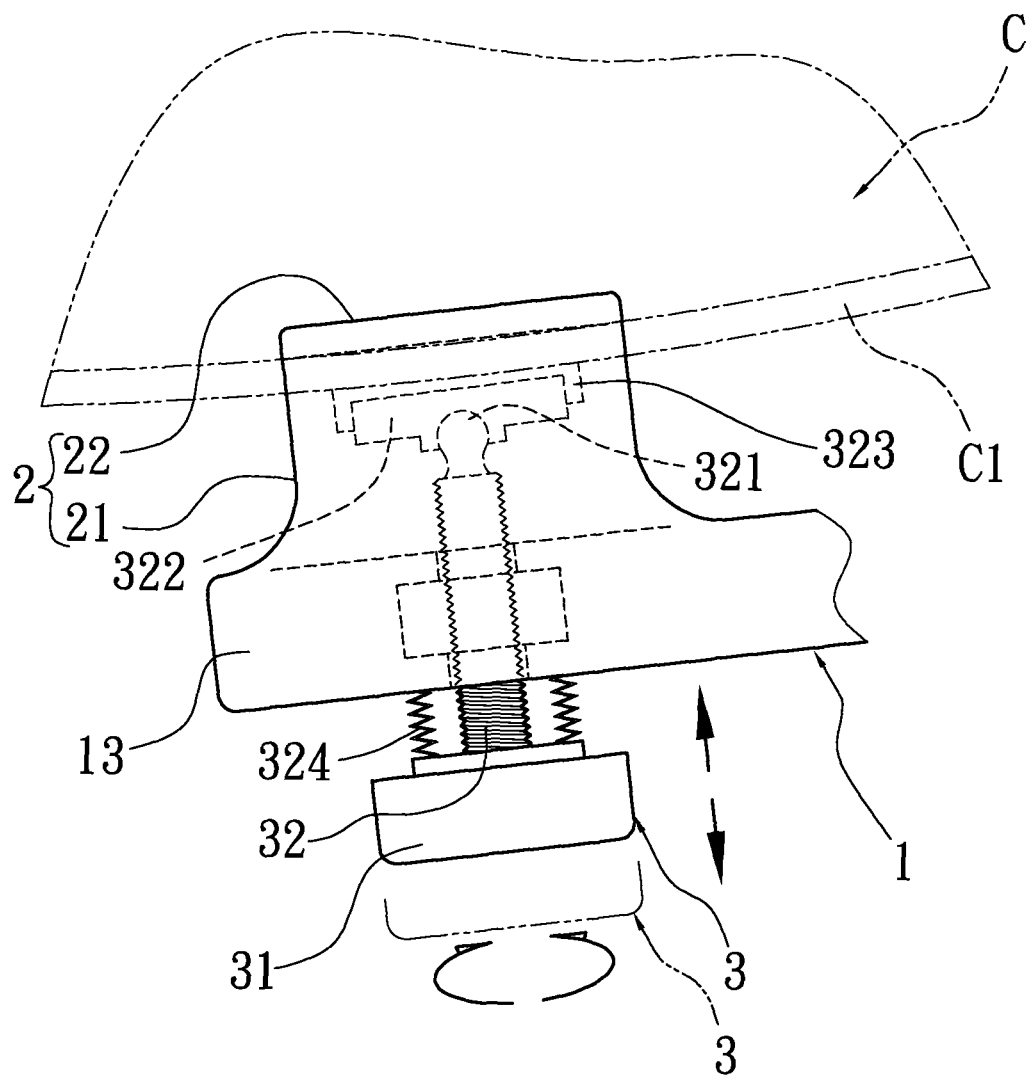
FIG. 6 is a schematic drawing of the present invention, illustrating the tightening-up device rotated inwards/backwards relative to the rim of the main rearview mirror.

The auxiliary rearview mirror mounting structure A further comprises a plurality of tightening-up devices 3 respectively mounted in the support arms 1 corresponding to the respective hooks 2 and rotatable inwards and outwards to lock the support arms 1 to the rim C1 of the main rearview mirror C or to unlock the support arms 1 from the rim C1 of the main rearview mirror C. Each tightening-up device 3 comprises a knob 31 disposed outside the respective support arm 1, a screw rod 32 extended from the knob 31 and threaded through the respective support arm 1 and terminating in a ball socket 321 (see FIG. 4 and FIG. 6), a friction pad formed of a rigid pad 322 that pivotally coupled to the ball socket 321 of the screw rod 32 and a flexible pad 323 bonded to one side of the rigid pad 322 opposite to the screw rod 32 and facing toward the hook portion 22 of one respective hook 2 at the respective support arm 1, and a flexible dust sleeve 324 sleeved onto the screw rod 32 and stopped between the knob 31 and the respective support arm 1.

Figure 5:
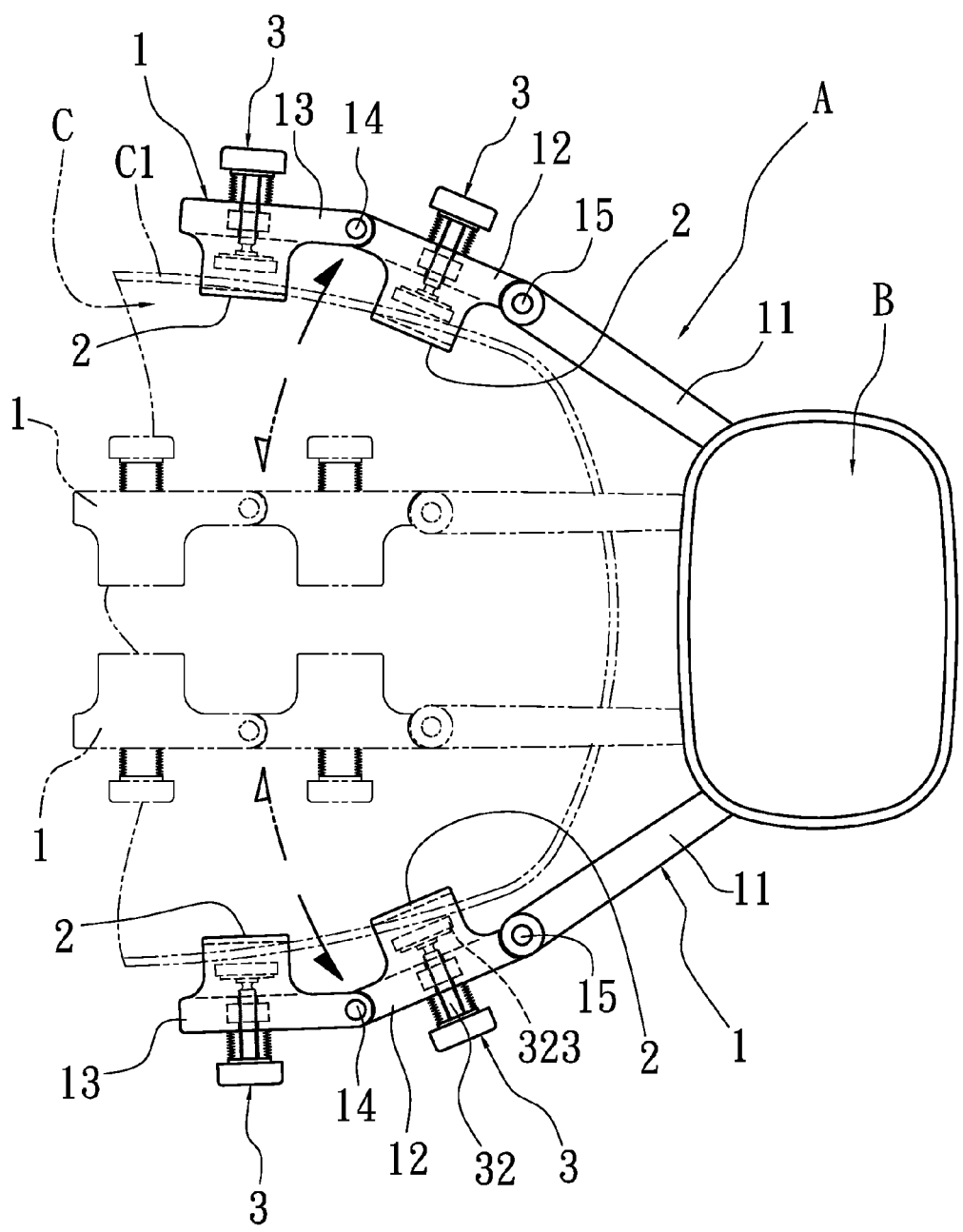
FIG. 5 is a schematic plain view illustrating the auxiliary rearview mirror mounting structure of the present invention attached to a main rearview mirror before locking.
Figure 7:
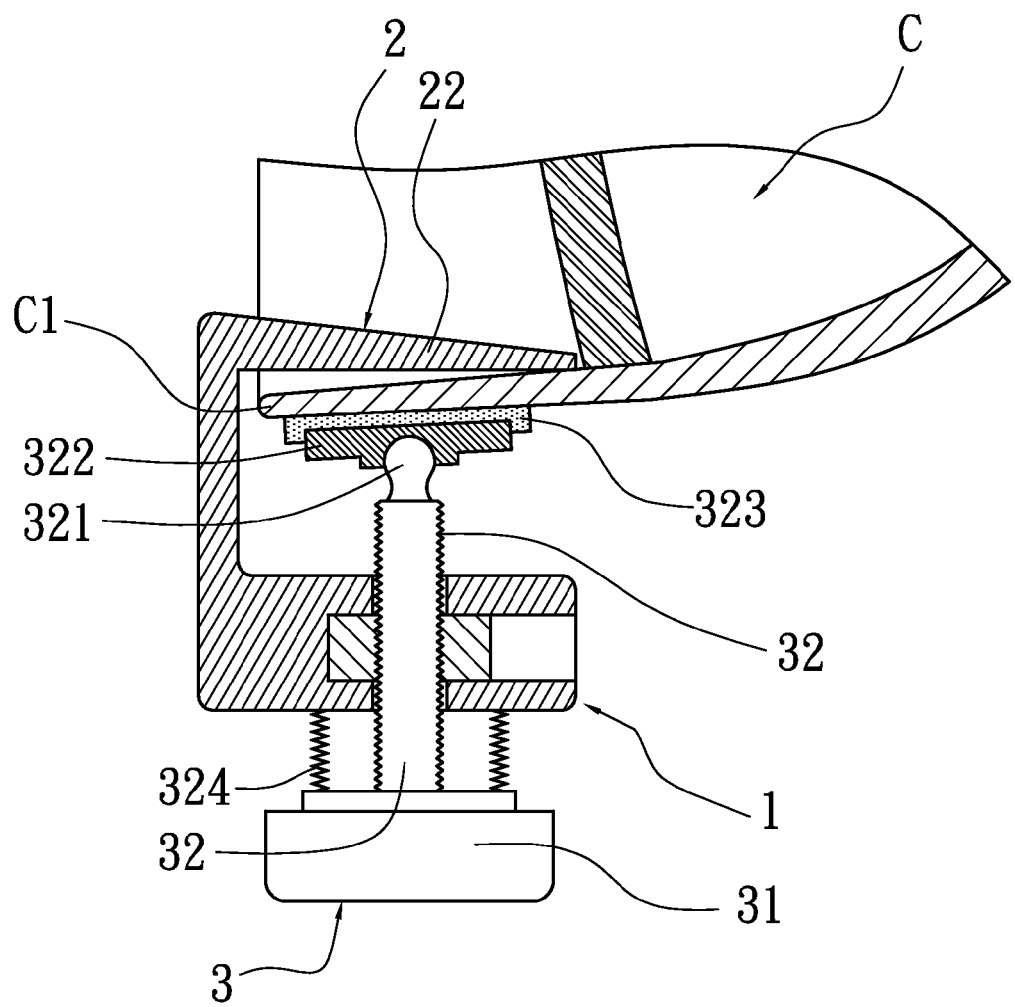
FIG. 7 is a schematic drawing of the present invention, illustrating the tightening-up device fastened tightly to the rim of the main rearview mirror.

In installation, as shown in FIG. 5, bend the support arms 1 to move the hooks 2 subject to the functioning of the respective first pivot joints 14 and second pivot joints 15, enabling the hook portions 22 of the respective hooks 2 to be hooked on an inner surface of the rim C1 of the main rearview mirror C. Thereafter, operate the knob 31 of each tightening-up device 3 to rotate the associating screw rod 32 relative to the respective support arm 1 (see FIG. 6), moving the associating flexible pad 323 into abutment against an opposing outer surface of the rim C1 of the main rearview mirror C (see FIG. 7). Thus, the support arms 1 are locked to the rim C1 of the main rearview mirror C by the hooks 2 and the tightening-up devices 3. When wishing to remove the auxiliary rearview mirror mounting structure A from the rim C1 of the main rearview mirror C, rotate the knob 31 of each tightening-up device 3 in the reversed direction to move the flexible pad 323 of each tightening-up device 3 away from the rim C1 of the main rearview mirror C. Thus, the mounting and dismounting operations of the auxiliary rearview mirror mounting structure A are quite simple.

Figure 8:
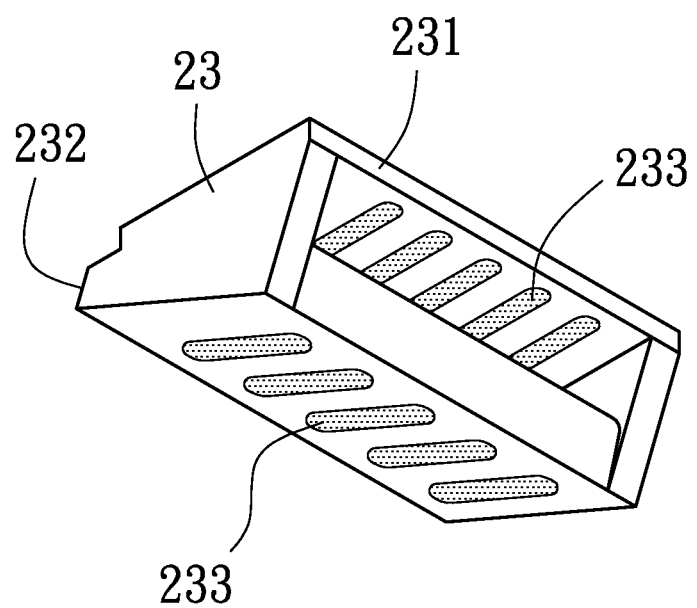
FIG. 8 is an elevational view of a flexible cap member for the hook portion of the hook in accordance with the present invention.
Figure 9:
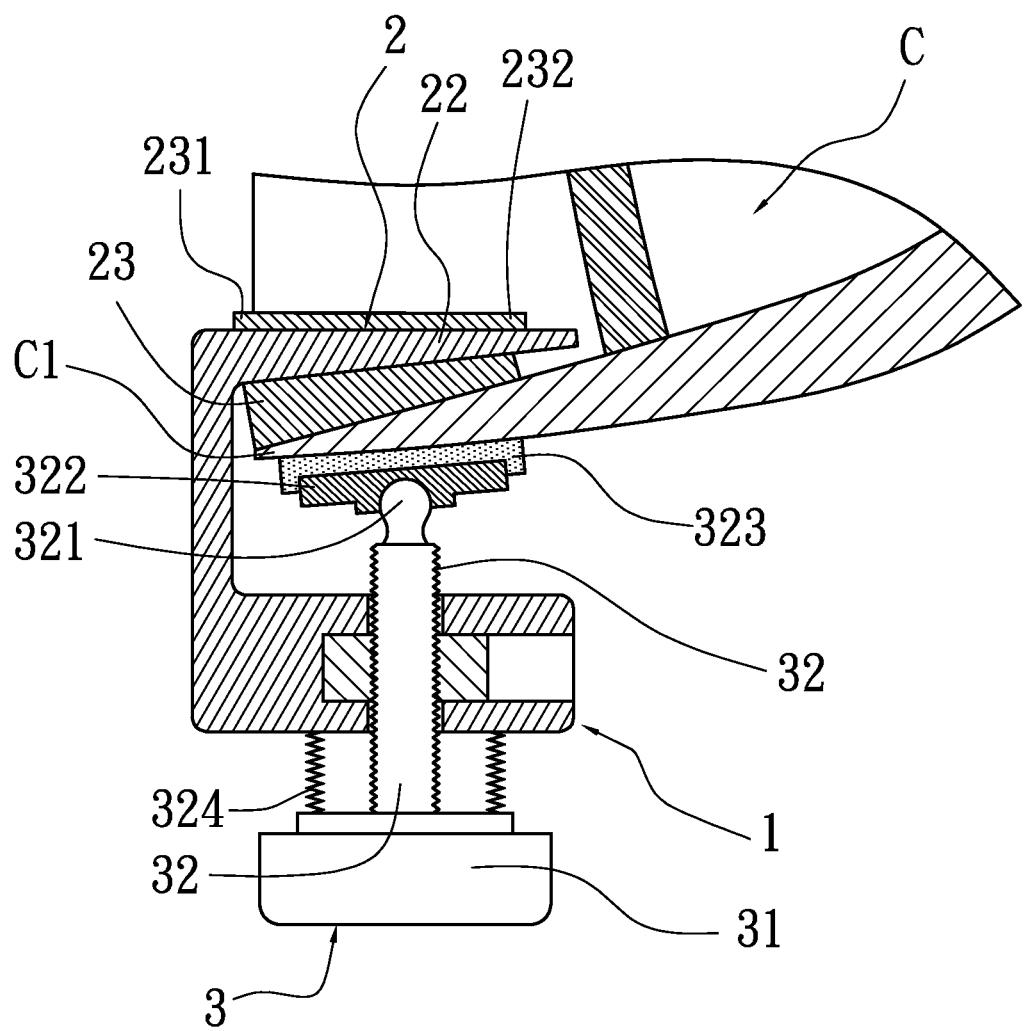
FIG. 9 corresponds to FIG. 7, illustrating the flexible cap member capped on the hook portion of the hook.

Further, a flexible cap member 23 (see FIG. 8) made from, for example, rubber, is capped on the hook portion 22 of each hook 2 (see FIG. 9). The flexible cap member 23 is a hollow member defining a relatively higher front side 231 and a relatively lower rear side 232 opposite to the relatively higher front side 231. In installation, the hook portion 22 of each hook 2 is inserted through the respective flexible cap member 23 in direction from the relatively higher front side 231 toward the relatively lower rear side 232. In some commercial main rearview mirrors C, the peripheral wall has a thickness gradually reducing in direction from the inner side toward the outer side (see FIG. 9). The design of the relatively higher front side 231 and relatively lower rear side 232 of the flexible cap member 23 can match with the gradually outwardly reducing wall thickness design of the peripheral wall of these commercial main rearview mirrors C. Further, flexible cap member 23 has non-slip ribs 233 located at the inner and outer walls thereof (see FIG. 8) for friction engagement with the rim C1 positively.

In conclusion, the invention provides auxiliary rearview mirror mounting structure A, which comprises two support arms 1 mounted at an auxiliary rearview mirror B, a plurality of hooks 2 located at the support arms 1 for hooking on a rim C1 of a main rearview mirror C, and a plurality of tightening-up devices 3 for locking the hooks 2 to the rim C1 of the main rearview mirror C, wherein each support arm 1 comprises first, second and third arm portions 11;12;13 respectively pivotally connected in series with first and second pivot joints 14;15. Thus, the support arms 1 can be curved, enabling the hooks 2 to be conveniently and positively hooked on the rim C1 of the main rearview mirror C and then locked thereto by the tightening-up devices 3.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An auxiliary rearview mirror mounting structure for fastening at a vehicle rearview mirror having a rim, comprising:
    an auxiliary rearview mirror;
    two support arms, each having a first arm portion pivotally coupled to said auxiliary rearview mirror, a second arm portion pivotally coupled with said first arm portion end-to-end via a first pivot joint, and a third arm portion pivotally coupled with said second arm portion end-to-end via a second pivot joint, wherein each of said support arms is selectively bent for matching with a shape of the rim of the vehicle rearview mirror;
    a plurality of hooks symmetrically located at said support arms for hooking at the rim of the vehicle rearview mirror, wherein one of said hooks is coupled at said second arm portion of each of said support arm at a position between said first pivot joint and said second pivot joint, and one of said hooks is coupled at said third arm portion of each of said support arms, wherein each of said hooks has an extension portion extended from an inner side of said support arm and a hook portion extended from a distal end of said extension portion for hooking at an inner side of the rim of the vehicle rearview mirror; and
    a plurality of tightening-up devices rotatably threaded through said support arms corresponding to said hooks respectively, wherein each of said tightening-up devices comprises a friction pad being actuated to move toward said hook portion of said hook for biasing against an outer side of the rim of the vehicle rearview mirror, such that said auxiliary rearview mirror is adapted for detachably fastening with the vehicle rearview mirror when securely sandwiching the rim of the vehicle rearview mirror between said hook portions of said hooks and said friction pads of said tightening-up devices.

2. The auxiliary rearview mirror mounting structure, as recited in claim 1, wherein said extension portion of said hook is integrally extended from said inner side of said support arm.

3. The auxiliary rearview mirror mounting structure, as claimed in claim 2, wherein each of said tightening-up devices further comprises a knob and a screw rod threaded through said support arm, wherein each of said screw rods has an outer end coupled with said knob and an inner end formed with a ball socket to couple with said friction pad, such that when said knob is rotated, said friction pad is moved toward said hook portion of said hook and is moved via said ball socket for fittingly biasing against the outer side of the rim of the vehicle rearview mirror so as to securely sandwich the rim of the vehicle rearview mirror between said hook portion of said hook and said friction pad of said tightening-up device.

4. The auxiliary rearview mirror mounting structure, as recited in claim 3, wherein said friction pad comprises a rigid pad pivotally coupled to said ball socket of said screw rod, and a flexible pad bonded to one side of said rigid pad and facing toward said hook portion of said hook.

5. The auxiliary rearview mirror mounting structure, as recited in claim 4, wherein each of said tightening-up devices further comprises a flexible dust sleeve sleeved onto said screw rod and stopped between said knob and said support arm.

6. The auxiliary rearview mirror mounting structure, as recited in claim 5, further comprising a flexible cap member capped on said hook portion of each of said hooks, wherein said flexible cap member is arranged for matching with a wall thickness of the rim of the vehicle rearview mirror.

7. The auxiliary rearview mirror mounting structure, as recited in claim 6, wherein said flexible cap member has a relatively higher front side and a relatively lower rear side, wherein said hook portion of said hook is inserted through said flexible cap member from said front side toward said rear side, wherein said flexible cap member further has a plurality of non-slip ribs located at inner and outer walls of said flexible cap member for frictionally engaging with the rim of the vehicle rearview mirror.

8. The auxiliary rearview mirror mounting structure, as claimed in claim 1, wherein each of said tightening-up devices further comprises a knob and a screw rod threaded through said support arm, wherein each of said screw rods has an outer end coupled with said knob and an inner end formed with a ball socket to couple with said friction pad, such that when said knob is rotated, said friction pad is moved toward said hook portion of said hook and is moved via said ball socket for fittingly biasing against the outer side of the rim of the vehicle rearview mirror so as to securely sandwich the rim of the vehicle rearview mirror between said hook portion of said hook and said friction pad of said tightening-up device.

9. The auxiliary rearview mirror mounting structure, as recited in claim 8, wherein said friction pad comprises a rigid pad pivotally coupled to said ball socket of said screw rod, and a flexible pad bonded to one side of said rigid pad and facing toward said hook portion of said hook.

10. The auxiliary rearview mirror mounting structure, as recited in claim 9, wherein each of said tightening-up devices further comprises a flexible dust sleeve sleeved onto said screw rod and stopped between said knob and said support arm.

11. The auxiliary rearview mirror mounting structure, as recited in claim 1, further comprising a flexible cap member capped on said hook portion of each of said hooks, wherein said flexible cap member is arranged for matching with a wall thickness of the rim of the vehicle rearview mirror.

12. The auxiliary rearview mirror mounting structure, as recited in claim 11, wherein said flexible cap member has a relatively higher front side and a relatively lower rear side, wherein said hook portion of said hook is inserted through said flexible cap member from said front side toward said rear side, wherein said flexible cap member further has a plurality of non-slip ribs located at inner and outer walls of said flexible cap member for frictionally engaging with the rim of the vehicle rearview mirror.

\* \* \* \* \*